United States Patent Office 3,113,024
Patented Dec. 3, 1963

3,113,024
PHOTOSENSITIVE COMPOSITION CONTAINING LEUCO DYE AND METHOD FOR PRODUCING VISIBLE IMAGES USING SAID COMPOSITION
Robert H. Sprague, Chagrin Falls, John A. Stewart, Parma, and James M. Lewis, Cleveland, Ohio, assignors to Horizons Incorporated, a corporation of New Jersey
No Drawing. Filed May 15, 1962, Ser. No. 194,953
9 Claims. (Cl. 96—48)

This invention relates to a non-silver direct print-out photographic system, sensitive to visible light, requiring no development and one which is readily fixed by exposure to gentle heating and one which is of adequate speed for use as a contact printing medium.

More particularly, it has been found that photosystems based on leuco bases of triphenylmethane dyes such as leuco Opal Blue possess an enhanced sensitivity to visible light and are readily fixed by heat alone, when a suitable activator selected from the group consisting of sulfonyl halides and sulfenyl halides is present in physical admixture with the leuco base whose photosensitivity to visible light is to be enhanced.

Preferably, the photosensitive leuco base and the activator which enhances its photosensitivity to the visible are dispersed in or are supported on a suitable base material which is chemically inert toward the leuco base and activator under the conditions of actual use of the two.

The invention will be better understood from the examples which follow, but it is to be noted that these are illustrative of preferred embodiments and are not to be construed as limiting the invention.

In the examples below, leuco Opal Blue is the leuco base of a triphenylmethane dye selected for purposes of illustration. Other leuco- or carbinol-bases of triphenylmethane dyes may be used instead of leuco Opal Blue including leuco Crystal Violet, leuco Malachite Green, leuco Victoria Blue, leuco p-rosaniline, and the carbinol base of leuco Opal Blue.

The first example illustrates the manner in which various compounds are screened to obtain an indication as to whether they provide sensitivity to visible light for leuco Opal Blue, it being noted that leuco Opal Blue dissolved in acetone experiences no noticeable visible reaction when exposed to the light source indicated.

EXAMPLE 1

Solutions of leuco Opal Blue and the compound being tested were made by adding to a solution of 25 mg. of leuco Opal Blue in 3 cc. of acetone, either 25 mg. of the compound being tested, if a solid or 3 drops of the compounds, if a liquid.

A few drops of each test solution were poured on sheets of filter paper and the paper was allowed to dry at room temperature (20° C.), in air. The prepared sheets were then exposed to the illumination from one reflector photoflood lamp at a distance of 4 inches, one half being exposed for 90 seconds while the other half received no exposure. The densities of the unexposed and the exposed areas were read immediately after exposure on the Eastman Model–1 color densitometer, using the red filter. The results were as follows:

Table 1

RESULTS OF LOB ACTIVATED WITH VARIOUS SULFONYL HALIDES WHEN COATED ON PAPER

| Sulfonyl Halide Being Tested | Density Exposed Half | Density Unexposed Half |
|---|---|---|
| No added sulfonyl halide (LOB alone) | 0.57 | 0.57 |
| 1,3–Benzenedisulfonyl Chloride | 3+ | .60 |
| 2,4–Dinitrobenzenesulfonyl Chloride | 3+ | .82 |
| o-Nitrobenzenesulfonyl Chloride | 3+ | .55 |
| β-Naphthalenesulfonyl Chloride | 3+ | .70 |
| m-Nitrobenzenesulfonyl Chloride | 3 | .65 |
| 3,3'-Diphenylsulfone Disulfonyl Chloride | 2.9 | .60 |
| Ethane Sulfonyl Chloride | 2.85 | .71 |
| p-Bromobenzenesulfonyl Chloride | 2.8 | .61 |
| p-Nitrobenzenesulfonyl Chloride | 2.78 | .55 |
| p-Iodobenzenesulfonyl Chloride | 2.77 | .50 |
| p-Acetamidobenzenesulfonyl Chloride | 2.70 | .50 |
| p-Chlorobenzenesulfonyl Chloride | 2.35 | .57 |
| p-Toluenesulfonyl Chloride | 2.30 | .65 |
| Methane Sulfonyl Chloride | 2.10 | .55 |
| Benzenesulfonyl Chloride | 1.90 | .38 |
| m-Nitrobenzenesulfonyl Fluoride | .61 | .55 |
| Benzenesulfonyl Bromide | 3+ | .80 |

From the results reported in Table I, it will be seen that the density of the exposed portion of the treated paper greatly exceeded that of the unexposed portion of the treated paper and it also will be seen that leuco Opal Blue alone, in the absence of any activator did not exhibit the sensitivity which it possessed when a sulfonyl bromide or chloride was present.

As evidenced by the results in Table I, both alkyl sulfonyl halides and aryl sulfonyl halides are effective in the present photosystem and while sulfonyl chlorides are preferred, sulfonyl bromides are also effective.

Sulfonyl halides useful in the present process include those represented by the general formula

$$R-SO_2-X$$

where R preferably represents a monovalent radical selected from the group consisting of lower alkyl (e.g., methyl, ethyl, propyl or butyl); aryl (e.g., benzene, naphthalene, diphenyl) and substituted aryl (e.g., nitrobenzene, bromobenzene, iodobenzene, acetamido benzene, toluene, chlorobenzene, etc.) and X is a halogen selected from the group consisting of Cl and Br.

In the above general formula R can be virtually any organic radical linked to sulfur through a carbon atom. Thus, for example, R can be alkyl, alkenyl, cycloalkyl, aryl, alkaryl, aralkyl, or conjugated, unsaturated, or saturated heterocyclic; or such radicals substituted by one or more groups such as, for example, alkyl, alkoxy, carboalkoxy, acyloxy, acylamido, acyl, formyl, alkenyl, cyano, halogen, nitro, alkyl mercapto, aryl mercapto, alkylsulfinyl, arylsulfinyl, alkylsulfonyl, arylsulfonyl, and alkenylsulfonyl.

EXAMPLE 2

The effect of various sulfenyl halides on the visible light sensitivity of leuco Opal Blue was determined in the same manner as in Example 1, i.e., by preparing a solution of leuco Opal Blue in acetone (25 mg. in 3 cc.) and then adding 25 mg. of the compound being tested, if a solid, or 3 drops of the compound being tested, if a liquid, to the leuco Opal Blue solution.

A few drops of the test solution were poured on sheets of filter paper and the paper was allowed to dry in air at room temperature (20° C.). The prepared sheets were then exposed to the illumination from one reflector photoflood lamp at a distance of 4 inches, one half being exposed for 90 seconds while the other half received no exposure. The densities of the unexposed and the exposed areas were read immediately after exposure on the Eastman Model-1 color densitometer, using the red filter. The results were as follows:

*Table II*

RESULTS OF LOB ACTIVATED WITH VARIOUS SULFENYL CHLORIDES WHEN COATED ON PAPER

| Sulfenyl Halide Being Tested | Density | |
|---|---|---|
| | Exposed Half | Unexposed Half |
| 2, 4-Dinitrobenzenesulfenyl Chloride | 3+ | .79 |
| o-Nitrobenzenesulfenyl Chloride | 2.7 | .80 |
| Leuco Opal Blue alone (no activator) | 0.57 | 0.57 |

In addition to the sulfenyl chlorides tested in Example 2, sulfenyl halides useful in the present process include those represented by the general formula

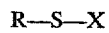

wherein R has the same meaning as in the formula for the sulfonyl halides which may be used and X represents chlorine or bromine.

One specific class of sulfenyl halides which may be employed in the reaction of this invention comprises aromatic sulfenyl halides wherein the sulfenyl halide radical is attached to a nuclear carbon atom of an aromatic hydrocarbon radical containing from 1 to 2 benzene rings, e.g., benzenesulfenyl chloride, p-toluenesulfenyl chloride, o-toluenesulfenyl chloride, xylenesulfenyl chloride, p-isopropylbenzene sulfenyl bromide, 2,4-diethylbenzene sulfenyl chloride, naphthalene-1-sulfenyl chloride, 4-biphenyl-1-sulfenyl chloride, tetrahydronaphthalenesulfenyl chloride, etc.

EXAMPLE 3

Instead of using filter paper as the chemically inert carrier as in Examples 1 and 2, the leuco Opal Blue and activator were dissolved in a liquid containing a film-forming plastic and cast as a film coating on a Mylar substrate, as described below.

A solution of leuco Opal Blue in acetone was prepared by dissolving 0.25 gram of leuco Opal Blue in 7.5 cc. of acetone. 7.5 cc. of a 10% solution of polystyrene in benzene was added to the solution of leuco Opal Blue and then 0.50 gram of p-nitrobenzene sulfonyl chloride was added and dissolved in the polystyrene, leuco Opal Blue solution. The resulting composition was coated with a wet thickness of 0.0015 inch with a Bird Applicator bar on unsubbed 500–D sheets of Mylar polyester film.

After drying in air, the effect of the activator on the leuco Opal Blue was examined by exposing the coating for 90 seconds under an Eastman No. 2 step tablet through the several Wratten filters indicated in Table III.

The light source was a General Electric No. 2 reflector photoflood lamp, employed at a distance of 12 inches from the subject.

The print was stabilized after exposure by heating for 60 seconds in a ventilated oven at a temperature of 150° C., which volatilized the activator from the coating and, in some cases, caused marked intensification of the image.

EXAMPLE 4–6

Coated films comprising the following compositions were prepared in the same manner as in Example 3, and exposed and heat stabilized as indicated in Table III.

| Components | 3 | 4 | 5 | 6 |
|---|---|---|---|---|
| Leuco Opal Blue (g.) | 0.25 | 0.5 | 0.5 | 0.5 |
| Acetone (cc.) | 7.5 | 7.5 | 7.5 | 7.5 |
| Polystyrene (10% in benzene) | 7.5 | 7.5 | 7.5 | 7.5 |
| Arylsulfonyl halide [1] (g.) | 0.50 | 0.5 | 0.5 | 0.67 |
| Exposure (seconds) | 90 | 300 | 60 | 60 |
| Heating at 150° C. (seconds) | 60 | 30 | 120 | [2]180 |

[1] The aryl sulfonyl halides in the above examples were as follows: 3,p-nitrobenzene sulfonyl chloride; 4,p-acetamide benzene sulfonyl chloride; 5,p-toluene sulfonyl chloride; 6-Benzene sulfonyl chloride.
[2] (Unventilated oven.)

The results of the exposures of unsubbed Mylar film coated with the compositions of Examples 3–6, exposed as indicated above and heated to 150° C. for the intervals shown were as follows:

*Table III*

RESULTS OF ACTIVATION WITH VARIOUS SULFONYL CHLORIDES WHEN COATED IN A POLYSTYRENE SOLUTION ON UNSUBBED MYLAR FILM (500-D) AND HEATED

| Activators | 2B-UV | | 47B BLUE | | 12 Yellow | | None-Clear | | 58 Green | | 25A RED | | Base plus Fog |
|---|---|---|---|---|---|---|---|---|---|---|---|---|---|
| | No. of Steps | 21st Step Gross Den. | No. of Steps | 21st Step Gross Den. | No. of Steps | 21st Step Gross Den. | No. of Steps | 21st Step Gross Den. | No. of Steps | 21st Step Gross Den. | No. of Steps | 21st Step Gross Den. | |
| p-Nitrobenzenesulfonyl Chloride (example 3) | 6 | 3+ | 0 | .15 | 6 | 3+ | 7 | 3+ | 0 | .18 | 3 | 3+ | .14 |
| p-Acetamidobenzenesulfonyl Chloride (Example 4) | 11 | 1.34 | 0 | .37 | 10 | 1.27 | 10 | 1.32 | 3 | .54 | 9 | 1.25 | .35 |
| p-Toluenesulfonyl Chloride (Example 5) | 5 | .80 | 1 | .23 | 4 | .75 | 6 | .86 | 1 | .20 | 4 | .46 | .20 |
| Benzenesulfonyl Chloride (Example 6) | 7 | .75 | 1 | .18 | 6 | .65 | 7 | .79 | 2 | .19 | 5 | .41 | .14 |

As will be apparent from the data above, the addition of small amounts of one or more activators of the types described above to leuco bases of triphenylmethane dyes imparts an increased sensitivity of the leuco base, as is indicated by the increase in density of the visible image obtained directly and without any further processing, when such compositions are exposed to visible light—as compared with the density of image obtained by exposure of the leuco base to the same visible light source, in the absence of any sulfonyl or sulfenyl halide of the type described.

In general the relative amount of activator utilized is more or less independent of the specific leuco base and amounts of from as little as 0.5 part by weight of activator up to as much as 5 parts by weight of activator per part by weight of the leuco base.

Having now described the invention in accordance with the patent statutes it is not intended that it be limited except as may be required by the appended claims.

We claim:

1. A photosensitive composition consisting essentially of a leuco base of a triphenylmethane dye and a material imparting increased visible light sensitivity to said leuco base, selected from the group consisting of organic sulfonyl of the formula R—SO₃—X wherein R is selected from the group consisting of alkyl, alkenyl, cycloalkyl, aryl, alkaryl, aralkyl and conjugated, unsaturated and saturated heterocyclic and X is a halogen selected from the group consisting of chlorine and bromine halides and organic sulfenyl halides of the formula R'—S—X' wherein R' has the same meaning as R above, and X' has the same meaning as X above, and wherein there are between 0.5 and 5 parts by weight of said light intensity imparting material for each part of leuco base in said composition.

2. The composition of claim 1 supported by a carrier material which is chemically inert to said leuco base and said material.

3. The composition of claim 1 dispersed in a film-forming plastic binder.

4. The composition of claim 1 coated on a paper base.

5. The composition of claim 1 wherein the material is an aryl sulfonyl chloride.

6. The composition of claim 1 wherein the material is an aryl sulfenyl chloride.

7. A method of producing a visible image which comprises: preparing a member including a thin layer containing a mixture consisting essentially of a leuco base of a triphenylmethane dye and a material increasing the visible light sensitivity of said leuco base and selected from the group consisting of organic sulfonyl halides of the formula R—SO₂—X wherein R is selected from the group consisting of alkyl, alkenyl, cycloalkyl, aryl, alkaryl, aralkyl and conjugated, unsaturated and saturated heterocyclic and X is a halogen selected from the group consisting of chlorine and bromine and organic sulfenyl halides of the formula R'—S—X' wherein R' has the same meaning as R, above, and X' has the same meaning as X, above, and wherein there are between 0.5 and 5 parts by weight of said light sensitivity imparting material for each part of leuco base in said composition, there being between 0.5 and 5 parts by weight of said material for each part by weight of leuco base in said composition, exposing said layer to a pattern of visible light; thereby producing a visible image on the areas exposed to visible light and thereafter fixing the image.

8. The method of claim 7 wherein the exposure is through a photographic negative.

9. A method of producing a visible image which comprises: preparing a member including a thin layer containing a mixture consisting essentially of a leuco base of a triphenylmethane dye and a material increasing the visible light sensitivity of said leuco base and selected from the group consisting of organic sulfonyl halides of the formula R—SO₂—X wherein R is selected from the group consisting of alkyl, alkenyl, cycloalkyl, aryl, alkaryl, aralkyl and conjugated, unsaturated and saturated heterocyclic and X is a halogen selected from the group consisting of chlorine and bromine and organic sulfenyl halides of the formula R'—S—X' wherein R' has the same meaning as R, above, and X' has the same meaning as X, above, and wherein there are between 0.5 and 5 parts by weight of said light sensitivity imparting material for each part of leuco base in said composition, there being between 0.5 and 5 parts by weight of said material for each part by weight of leuco base in said composition, exposing said layer to a pattern of visible light; thereby producing a visible image on the areas exposed to visible light; and exposing said image bearing film to thermal radiation to intensify the visible image.

References Cited in the file of this patent

UNITED STATES PATENTS

| | | |
|---|---|---|
| 2,676,887 | Chalkley | Apr. 27, 1954 |
| 2,844,465 | Chalkley | July 22, 1958 |
| 2,936,235 | Chalkley | May 10, 1960 |

FOREIGN PATENTS

| | | |
|---|---|---|
| 776,043 | Great Britain | June 5, 1957 |
| 776,044 | Great Britain | June 5, 1957 |

OTHER REFERENCES

McCloskey et al.: "Photosensitizers for Polyester-Vinyl Polymerization," Ind. and Eng. Chem., vol. 47, No. 10, October 1955, pages 2125–2129.

Midgrdichian: "Organic Synthesis," Reinhold Publ. Co., New York, 1957, page 595 relied on. (Copy in Scientific Library; Cat. No. QD/262/M55.)

UNITED STATES PATENT OFFICE
CERTIFICATE OF CORRECTION

Patent No. 3,113,024                      December 3, 1963

Robert H. Sprague et al.

It is hereby certified that error appears in the above numbered patent requiring correction and that the said Letters Patent should read as corrected below.

Column 5, line 2, before "of" insert -- halides --; same line 2, for "R-SO$_3$-X" read R-SO$_2$-X --; line 6, strike out "halides"; same column 5, line 10, for "intensity" read -- sensitivity --.

Signed and sealed this 28th day of April 1964.

(SEAL)
Attest:
ERNEST W. SWIDER

Attesting Officer

EDWARD J. BRENNER
Commissioner of Patents